April 10, 1962    C. BUDDINGH    3,029,065
MEANS FOR MOVING VEHICLES
Filed Jan. 15, 1960

INVENTOR
CORNELIUS BUDDINGH

BY *Grice and Heneveld*

ATTORNEYS

United States Patent Office 3,029,065
Patented Apr. 10, 1962

3,029,065
MEANS FOR MOVING VEHICLES
Cornelius Buddingh, Caledonia, Mich.
Filed Jan. 15, 1960, Ser. No. 2,672
8 Claims. (Cl. 254—35)

This invention relates to a means for moving vehicles. More particularly, this invention relates to an apparatus for moving a vehicle out of a hole and the like, the apparatus adapted to be used in combination with an ordinary bumper jack.

Many times, the operator of an automobile finds himself unable to move the car out of a hole or rut caused by mud, snow, etc. Most of the time, the rear tires of the automobile are positioned in the hole or rut such that if a means could be provided to move the automobile a foot or two in either direction, the automobile would no longer be immovable under its own power. Bumper jacks presently in existence are merely adapted to raise or lower an automobile so that they provide little help in such a situation. Consequently, the driver must have his automobile towed out of the rut. This is especially true in the case of automobiles having automatic transmissions since the driver cannot "rock" the automobile back and forth in attempting to get out of such a rut.

It is an object of this invention to provide an apparatus which is especially adapted for moving an automobile up out of such a rut and a foot or two forward away from the rut. This apparatus is adapted to be used in combination with an ordinary bumper jack of the type which is considered standard equipment in automobile trunks.

Another object of this invention is to provide such an apparatus which is compact enough so that it may be carried in the trunk of an automobile at all times.

Another object of this invention is to provide such an apparatus which operates in such a manner so that it performs the hereinbefore described function safely, quickly and simply.

A still further object of this invention is to provide such an apparatus using a minimum of parts, making it inexpensive enough to be a practical item for all automobile owners.

These and other objects of this invention will become obvious to those skilled in the art relating to such equipment upon reading the following specification in conjunction with the accompanying drawings, wherein.

Figure 2:
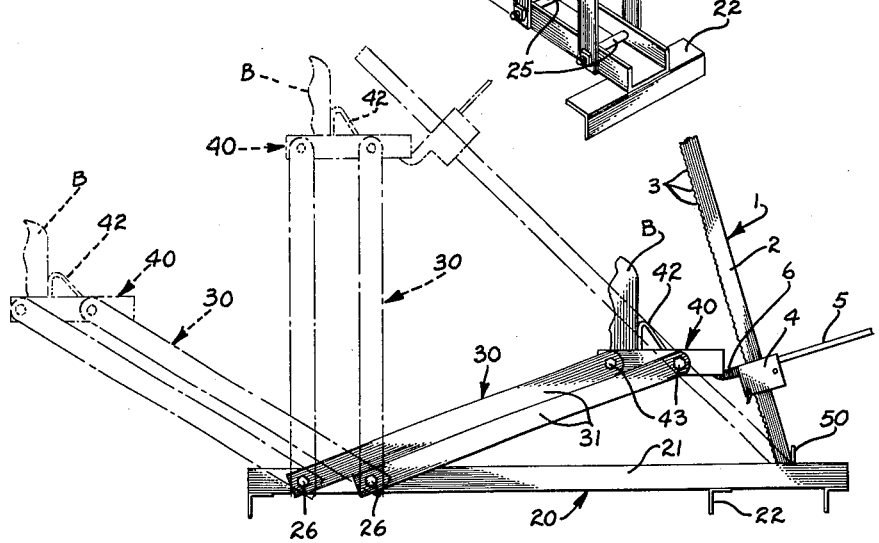
FIG. 2 is a side, elevational view of the apparatus shown in FIG. 1, the various positions of the apparatus during operation being shown in dotted lines.

The apparatus comprising this invention is adapted to be used in combination with a bumper jack of standard construction. Such a bumper jack is shown in FIG. 2 and is designated by the reference numeral 1. The bumper jack 1 includes an upstanding bar 2 having a plurality of notches 3 on one surface thereof. The member 4 slidably envelopes the bar 2, the member 4 riding up the bar 2 on the notches 3 by means of movement of the handle 5. The outwardly projecting finger 6 is adapted to ordinarily be positioned under the bumper of an automobile, thereby raising the automobile as the member 4 is moved up the bar 2. Such a bumper jack does not comprise a part of this invention, but rather is shown and described since the apparatus comprising this invention may be used in combination therewith.

The apparatus for moving a vehicle for use in combination with such a bumper jack comprises a ground engaging member having an elongated arm member pivotally connected thereto. Means is provided on the free end of this elongated member for bearing against and supporting a vehicle. Means are also provided on the ground engaging member and the elongated arm member for receiving a bumper jack whereby the elongated member may be pivoted about its pivotal connection. As the elongated member thus pivots, the vehicle is first raised and then moved forward to be again lowered at a point away from its original position.

Figure 1:
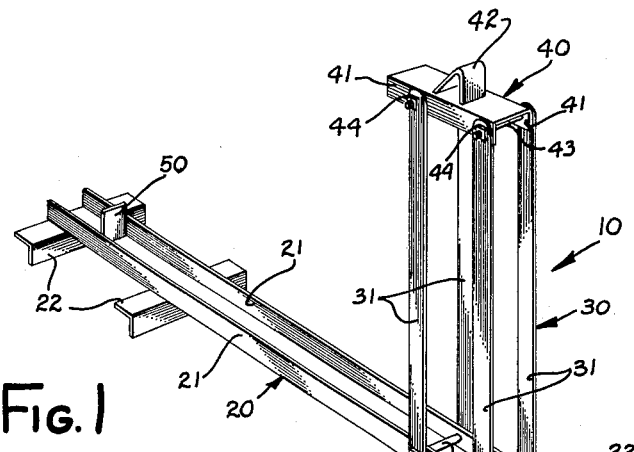
FIG. 1 is a perspective view of the apparatus comprising this invention.

Turning specifically to the drawings, this apparatus is designated by the reference numeral 10 (FIG. 1). The apparatus 10 includes a ground engaging base member 20, an elongated arm 30 pivotally secured to the base member 20 and a bearing platform 40 pivotally secured to the free end of the elongated arm 30.

The ground engaging base member 20 is preferably U-shaped in cross section, having upstanding side portions 21. Secured to the bottom of the base member 20 are a plurality of angles 22, the purpose of the angles 22 being to provide frictional engagement with the ground. It should be understood that other means could be provided for such frictional engagement with the ground to prevent the base member 20 from sliding across the ground during use. A pair of pins 25 are rotatably mounted within the upstanding portions 21 of the U-shaped base member near one of its ends. These pins include heads 26 at one end and threaded portions at their other end. The purpose of these pins will be more fully described hereinafter.

Figure 3:
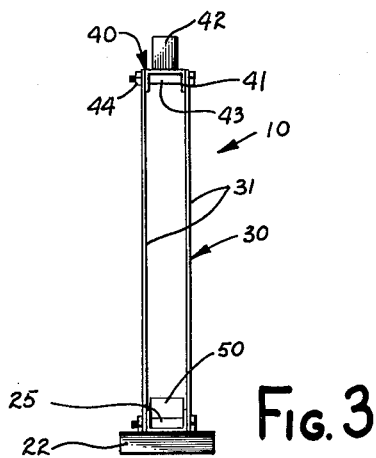
FIG. 3 is an end view of the apparatus shown in FIG. 1.

The elongated arm member 30 includes four rigid bars 31, two such bars pivotally secured at each side of the base member 20 near one end thereof in pantographic arrangement. The pins 25 extend through the lower extremities of the bars 31 and through the upstanding side portions 21 of the base 20, the bars being rotatable about the pins (FIGS. 1 and 3). The nuts 28 secure the pins in position, thereby pivotally securing the bars 31 to the base member 20.

A biasing platform 40 is pivotally secured to the free end of the elongated arm 30 at the other extremities of the bars 31. The bearing platform 40 is preferably of inverted U-shape, thereby including the depending flanges 41. An upstanding stop member 42 is rigidly secured to the top of platform 40. Pins 43, similar to pins 25 described hereinbefore, extend through the other extremities of the bars 31 on one side of the apparatus 10, through the depending flanges 41 and through the bars 31 on the other side of the apparatus 10. The nuts 44 are then threaded on the pins 43 thereby pivotally securing the bearing platform 40 to the elongated arm member 30.

A stop member 50 is positioned between the upstanding portions 21 of the U-shaped base member 20 near the end opposite from where the elongated arm member 30 is pivotally attached. The purpose of the stop member 50 in combination with the other structure described will now be disclosed in detail upon describing the operation of the apparatus 10.

Turning specifically to FIG. 2, the bumper of an automobile is designated by the letter B. When an automobile is immovable under its own power because the rear tires are positioned in a rut, the apparatus 10 is placed in the position shown in full lines in FIG. 2, the platform 40 being placed under the bumper and the upstanding stop member 42 bearing against the back of the bumper. The lower portion of the bumper jack 1 is positioned between the upstanding portion 21 of the base member 20 and against the upstanding stop member 50. The protruding finger 6 of the bumper jack 1 is positioned under the bearing platform 40 between the depending flanges 41. It will now be noted that upon operation of the bumper jack 1 the bearing platform 40 will be lifted upwardly and forwardly to the position shown in dotted lines in FIG. 2 with the elongated arm 30 being substantially perpendicular to the base member 20. This also of course raises the bumper B upwardly and forwardly. Upon further operation of the bumper jack, the platform 40 will pass to the position shown in dotted lines at the extreme left of FIG. 2, moving the bumper B downwardly and still further forwardly. Actually, when the elongated arm 30 passes the point where it is perpendicular to the base member 20, the weight of the automobile will move the arm 30 to the extreme forward position shown in FIG. 2.

Thus, with this simple operation, the automobile has been lifted out of the rut and moved a substantial distance forward. In practically every instance, the automobile can then be moved under its own power since it is no longer in the rut which prevented its movement in the first place. By these simple steps, the necessity of being towed out of a rut has in most cases been eliminated.

This invention provides a means whereby an automobile may be moved out of a rut, the apparatus especially well adapted to be used in combination with a bumper jack which is standard equipment in most automobiles. The apparatus performs this function quickly and simply enough so that anyone who can operate a bumper jack can operate this apparatus. It is small and compact and therefore can be carried at all times in the trunk of an automobile. It is simple in construction and therefore practically trouble free.

While only one embodiment of this invention has been shown and described, it is possible that the invention may be practiced through the use of certain other embodiments without departing from the spirit and scope of the invention. These other embodiments are to be included within the scope of this invention unless the following claims specifically state otherwise.

I claim:

1. Apparatus for moving a vehicle for use in combination with a bumper jack, said apparatus comprising: a ground engaging member; an elongated member pivotally connected to said ground engaging member; means on said elongated member for bearing against and supporting the vehicle; and means on said ground engaging member and said elongated member for receiving the bumper jack therebetween whereby said elongated member may be pivoted about said pivotal connection, past a vertical position, by the bumper jack.

2. Apparatus for moving a vehicle for use in combination with a bumper jack, said apparatus comprising: a ground engaging member; an elongated member pivotally connected at one of its ends to said ground engaging member; a bearing surface pivotally connected to the other end of said elongated member for bearing against and supporting the vehicle; and means on said ground engaging member and said elongated member for receiving the bumper jack therebetween whereby said elongated member may be pivoted about said pivotal connection to said ground engaging member, past a vertical position, by the bumper jack.

3. Apparatus for moving a vehicle for use in combination with a bumper jack, said apparatus comprising: a ground engaging base member; an elongated arm member pivotally connected at one of its extremities to said ground engaging base member near one of its ends; a bearing platform pivotally connected to the other extremity of said arm member, said bearing platform shaped to bear against and support the vehicle; and means near the other end of said ground engaging member for receiving the lower portion of a bumper jack whereby the bumper jack is received between said means and said bearing platform for pivoting said elongated member about its pivotal connection to said base member, past a vertical position, by the bumper jack.

4. Apparatus for moving a vehicle as defined in claim 3, said elongated arm member including a pair of bars in pantographic arrangement.

5. Apparatus for moving a vehicle for use in combination with a bumper jack, said apparatus comprising: a U-shaped ground engaging base member; an elongated arm member pivotally connected at one of its extremities to the upstanding portions of said U-shaped base member near one of its ends; a bearing platform pivotally connected to the other extremity of said arm member, said bearing platform shaped to bear against and support the vehicle; and an upstanding stop member positioned between said upstanding portions near the other end of said U-shaped ground engaging base member for receiving the lower portion of a bumper jack whereby the bumper jack is received between said upstanding stop member and said bearing platform for pivoting said elongated member about its pivotal connection to said base member, past a vertical position, by the bumper jack.

6. Apparatus for moving a vehicle as defined in claim 5, said elongated arm member including a pair of bars in pantographic arrangement.

7. Apparatus for moving a vehicle for use in combination with a bumper jack, said apparatus comprising: a U-shaped ground engaging base member; means on the bottom of said base member for frictional engagement with the ground; an elongated arm member including a pair of bars in pantographic arrangement each pivotally connected at one of its extremities to the upstanding portions of said U-shaped ground engaging base member near one of its ends; a bearing platform pivotally connected to the other extremity of said arm member for bearing against and supporting the vehicle; an upstanding stop means on the top of said bearing platform; and an upstanding stop member positioned between said upstanding portions near the other end of said U-shaped ground engaging base member for receiving the lower portion of a bumper jack whereby the bumper jack is received between said upstanding stop member and said bearing platform for pivoting said elongated arm member about its pivotal connection to said base member, past a vertical position, by the bumper jack.

8. Apparatus for moving a vehicle for use in combination with a bumper jack, said apparatus comprising: a U-shaped ground engaging base member; means on the bottom of said base member for frictional engagement with the ground; an elongated arm member including a pair of bars in pantographic arrangement on each side of said base member, each bar pivotally connected at one of its extremities to a pin rotatably mounted in the upstanding portions of said U-shaped ground engaging base member near one of its ends; an inverted U-shaped bearing platform, the other extremities of each of said bars of said elongated arm member pivotally secured to a pin rotatably mounted in the depending flanges of said inverted U-shaped bearing platform; an upstanding stop means on the top of said bearing platform; and an upstanding stop member positioned between said upstanding portions near the other end of said U-shaped ground engaging base member for receiving the lower portion of a bumper jack whereby the bumper jack is received between said upstanding stop member and said bearing platform for pivoting said elongated arm member about its pivotal connection to said base member, past a vertical position, by the bumper jack.

References Cited in the file of this patent

UNITED STATES PATENTS

| | | |
|---|---|---|
| 827,406 | Austin | July 31, 1906 |
| 1,508,154 | Bellamy | Sept. 9, 1924 |
| 2,361,690 | Hunz | Oct. 31, 1944 |
| 2,433,537 | Ward | Dec. 30, 1947 |
| 2,743,903 | Lucker | May 1, 1956 |